(12) United States Patent
Asa et al.

(10) Patent No.: US 6,368,500 B1
(45) Date of Patent: Apr. 9, 2002

(54) SYSTEM FOR TREATMENT OF WASTE

(75) Inventors: Amir Asa, Nahariva; Israel Faig, Caesarea, both of (IL)

(73) Assignee: Arrow Ecology & Engineering Overseas (1999) Ltd., Haifa (IL)

( * ) Notice: Subject to any disclaimer, the term of this patent is extended or adjusted under 35 U.S.C. 154(b) by 0 days.

(21) Appl. No.: 09/594,571

(22) Filed: Jun. 15, 2000

(30) Foreign Application Priority Data

Oct. 1, 1999 (IL) .................................................. 132173

(51) Int. Cl.[7] .............................. B03B 9/06; C02F 3/28
(52) U.S. Cl. ................... 210/173; 210/180; 210/195.1; 210/259; 210/603
(58) Field of Search ...................... 210/173, 194, 210/195.1, 195.3, 196, 259, 202, 603, 180

(56) References Cited

U.S. PATENT DOCUMENTS

| | | | |
|---|---|---|---|
| 1,298,577 A | | 3/1919 | Sawyer et al. |
| 2,219,011 A | | 10/1940 | Kidwell et al. ................ 83/46 |
| 2,325,080 A | | 7/1943 | Stephanoff et al. ............ 83/46 |
| 3,568,839 A | | 3/1971 | Dunlea et al. ............... 210/152 |
| 3,597,308 A | | 8/1971 | Brooks ........................... 162/4 |
| 3,897,215 A | | 7/1975 | Davidson et al. .......... 23/259.1 |
| 4,185,680 A | * | 1/1980 | Lawson ....................... 210/603 |
| 4,198,211 A | * | 4/1980 | Shattock ...................... 210/603 |
| 4,250,023 A | | 2/1981 | Samis et al. ..................... 209/3 |
| 4,511,370 A | * | 4/1985 | Hunziker et al. ........... 210/603 |
| 4,652,374 A | * | 3/1987 | Cohen ......................... 210/603 |
| 4,722,741 A | | 2/1988 | Hayes ........................... 48/197 |
| 4,846,973 A | * | 7/1989 | Kelymar ..................... 210/603 |
| 4,861,519 A | * | 8/1989 | Tusa et al. .................. 210/603 |
| 5,248,602 A | * | 9/1993 | Schmid et al. .............. 210/603 |
| 5,377,917 A | * | 1/1995 | Wiljan et al. ................ 210/603 |
| 5,387,267 A | | 2/1995 | Warf et al. .................... 44/589 |
| 5,548,971 A | | 8/1996 | Rockenfeller et al. ...... 62/324.2 |
| 5,795,479 A | * | 8/1998 | Vogt et al. ................... 210/603 |

FOREIGN PATENT DOCUMENTS

| | | |
|---|---|---|
| DE | 26 28 612 A1 | 12/1977 |
| DE | 195 07 703 C1 | 8/1996 |
| DE | 197 49 530 A1 | 5/1999 |
| DE | 198 00 224 C1 | 5/1999 |
| EP | 0 521 685 A2 | 7/1993 |

* cited by examiner

Primary Examiner—Christopher Upton
(74) Attorney, Agent, or Firm—Nath & Associates PLLC; Gary M. Nath; Marvin C. Berkowitz

(57) ABSTRACT

A system for treatment of collected waste comprises a waste receiving pit; at least one first separator for separating between first waste material having a specific gravity equal or less than that of water and second waste material having a specific gravity above that of water; at least one crusher for receiving said first waste material, substantially crushing at least a particulate portion thereof to a smaller particulate form to obtain treated waste material and producing a liquid product comprising water carrying the treated waste material; at least one acetogenic fermentor for receiving said liquid product and for anaerobic acetogenic fermentation thereof to produce a first fermented effluent; at least one methanogenic fermentor for receiving said first fermented effluent and for anaerobic methanogenic fermentation thereof to produce a second fermented effluent; at least one liquid feed line for feeding at least one of said first or said second effluent into one or more of the system's devices for subsystems. Provided are also apparatuses for use in said system.

48 Claims, 11 Drawing Sheets

SYSTEM FOR TREATMENT OF WASTE

FIELD OF THE INVENTION

The present invention concerns a system for the treatment of unsorted waste. The present invention further concerns apparatuses which may be used in such a system.

The unsorted waste dealt with by the present invention includes solid or semi-solid waste produced primarily in households, offices, etc. Such waste, in most cases is composed of solid waste resulting from human consumption. This includes, for example, food scraps, yard waste, organic materials and any other materials of widely varying physical characteristics such as fibrous material, e.g. paper, cardboard and rags, plastic material, glass, wires, light gauge metallic containers, and relatively heavy, materials such as heavy metal pipes and iron castings. Such waste will be retreated to herein as "municipal solid waste" (MSW).

BACKGROUND OF THE INVENTION

The treatment and/or disposal of MSW presents a major challenge in the urban setting. It has become particularly problematic in recent years as a result of growing population and an increase of per capita consumption. The treatment and/or disposal presents a continuously growing challenge to urban authorities.

Conventionally MSW has been disposed of by such means as incineration, land fills or recycling. Recycling requires some discipline on behalf of the inhabitants in initially sorting the MSW into its major constituents, e.g. metal, glass, organic waste, etc., and disposing each type of waste in a different container Burial of MSW or disposal in land fills concentrates the MSW in a single location. Such a waste treatment method has various environmental undesired effects including risk to contamination of ground water, maleodors, attraction of various pests which thrive on the waste, and others.

Incineration presents a major problem of air pollution. In addition, it presents a problem of disposal of the produced ash particularly as it may contain relatively high concentration of non-combustible toxic substances such as toxic metals. The energy required for combustion is primarily used for the initial removal of the liquid from the waste and some separation of the waste to its components.

Recycling of certain waste material is again problematic by current methods, as it requires separation of the material into its components, which as pointed about above, necessitates a measure of discipline from the inhabitant to separate waste material into its component. Experience shows that is never completely satisfactory.

U.S. Pat. No. 1,298,577 discloses a system for separation of gold from sand using a device that allowed heavier gold to settle out of a moving water stream with the sand remaining suspended. U.S. Pat. No. 5,548,971 disclosed the separation of rocks from wood chips by using an apparatus which subjected the mixture of wood chips and foreign particles, such as rocks and nails, to an upward flow of water. The employment of water floatation techniques for the separation of ingredients in MSW include U.S. Pat. No. 3,568,839, U.S. Pat. 3,597,308 U.S. Pat. No. 3,987,215, U.S. Pat. No. 4,250,023 and U.S. Pat. No. 5,387,267. These patents had the objective to yield a complete separation of organic material, including paper, textiles, wood, plastic and food waste from inorganic material such as metals, glass, sand and dirt in order to produce a low ash content fuel or compost material. Nevertheless, none of these patents enable separation of collected, unsorted waste and recycling of the waste components after their being separated.

GENERAL DESCRIPTION OF THE INVENTION

The present invention provides, by its first aspect, a system for treatment of collected unsorted waste, comprising a waste receiving pit; at least one first separator for separating between first waste material having a specific gravity equal or less than that of water and second waste material having a specific gravity above that of water; at least one crusher for receiving said first waste material, substantially crushing at least a particular portion thereof to a smaller particulate form to obtain treated waste material and producing a liquid product comprising water carrying the treated waste material; at least one acetogenic fermentor for receiving said liquid product and for anaerobic acetogenic fermentation thereof to produce a first fermented effluent; at least one methanogenic fermentor for receiving said first fermented effluent and for anaerobic methanogenic fermentation thereof to produce a second fermented effluent; at least one liquid feed line for feeding at least one of said first or said second effluent into one or more of the system's devices for subsystems.

The present invention further provides by other of its aspects, an apparatus for separation of collected unsorted waste, and an apparatus for treating a liquid which carries waste particles. These two apparatuses may be used, in the above system, in accordance with some preferred embodiments thereof.

The invention thus provides in accordance with a second aspect thereof, an apparatus for separation of collected unsorted waste, comprising a liquid-holding receptacle with an open top for receiving the waste and a bottom end formed with a sink portion for receiving a first waste material having a specific gravity larger than that of water; a first conveyor with its bottom end within said sink portion and its top end extending out of the receptacle to convey the first waste material from said sink portion to a first collecting device outside said receptacle, and a second conveyor with its bottom end at another portion of the receptacle being at a level higher than that of said sink portion to convey a second waste material having a specific gravity below that of water, to a second collecting device; a barrier-defining member situated above said first conveyor at a clearance therefrom permitting delivery of the said first waste material by said first conveyor and defining a barrier for articles introduced into the receptacle from directly contacting said first conveyor but in said sink portion; liquid injection nozzles disposed within said receptacle for injection of liquid streams into the liquid within the receptacle to impart lateral movement onto articles within said liquid.

According to a preferred embodiment of said second aspect, the apparatus comprises a shredding device for shredding solid matter dispersed with said liquid. The shredding device may have the general form of a rotating cylinder with arcuated blades for cutting or shredding the solid matter as a result of its rotation. This arrangement is particulary important for the purpose of shredding plastic material such as plastic bags, disposable diaphers, which are one of the characteristics and which present a major disposal problem of household waste. The shredding device can also facilitate of closed plastic bags.

The present invention thus provides in accordance with a third aspect thereof, an apparatus for treating a liquid carrying waste material, comprising a tubular body defining of flow path between a liquid inlet and a liquid outlet, the tubular body having a plurality of straight sections, two adjacent sections, consisting of a proximal section being the one more proximal in the flow path to the inlet and a distal section, being connected to one another at ends thereof to form corners with angles between them, at their point of contact; and high pressure liquid nozzles disposed within the tubular body at said corners thereof and arranged such that they inject an axial jet of pressurized liquid into the distal section.

In the current disclosure, above and below, the terms "collected waste", "MSW", "household-derived waste", "Municipal unsorted-solid waste" and other similar terms or derivation thereof, may be used interchangeably. The present invention is useful for the treatment of waste of a variety of different sources. It should be noted that the exact constituent of the MSW may change from one locality to another, depending on whether it is derived from a residential area, from an office area; etc. from one to another; seasonably; independent to the climate, etc. It is a characterizing feature of the invention that initial separation of the waste to its components is not required. Furthermore, in accordance with the invention, the various components are collected separately and may subsequently be recycled.

The system, in accordance with one embodiment thereof comprises a sorter subsystem for receiving said second waste material and for sorting it according to predefined characteristics. This sorter subsystem may employ sorting apparatuses of a kind generally known per se. In accordance with a preferred embodiment, the sorter subsystem is connected to at least one liquid feed lines for rinsing the sorted waste material and thus consequently, a rinsed separated material ready for re-cycling is obtained. Such material may include glass, ferrous and non-ferrous metals. Ferrous metal and non-ferrous metal may be separated from one another based on the magnetic properties of the ferrous metal.

In accordance with one preferred embodiment of the system, the first separator is an apparatus according to the second aspect of the invention.

In the separator, the barrier-defining member according to the second aspect of the invention, is preferably a planar and situated essentially parallel to said conveyor. The nozzles may, in accordance with one embodiment of disposed or formed at the upper wall of said barrier-defining member. The barrier-defining member typically extends between side walls of the receptacle situated opposite one another on both sides of the first conveyor.

Typically, said second waste material is fed first into one or more devices which subjects the waste to an initial treatment by grinding, shredding or both, and only then this treated waste product is fed into the crusher.

In accordance with another preferred embodiment, the system comprises a filtration-separation subsystem for receiving the liquid waste material and separating particulate material therefrom with a particle size above a predefined size. Further in accordance with this preferred embodiment, the system typically comprises a feed line for feeding the separated particulate material back into the crusher with another feed line, for feeding the separated liquid, typically collected in a filtered liquid reservoir to the acetogenic fermentor.

In accordance with one preferred embodiment, the crusher in the system is the hydro-crusher apparatus according to the third aspect of the invention. The nozzles in this hydro crusher are typically connected and receive high liquid pressure from a high pressure pump which pumps liquid from the filtered liquid reservoir which contains a liquid separated by filtration and separation subsystem.

The filtration and separation subsystem, in accordance with this preferred embodiment of the invention, comprises three devices as follows: a first, filtration and separation device, for receiving the liquid product containing the liquid waste, filtering out therefrom particulate material of a size above a predefined size and for separating a sediment-containing fraction from the filtered liquid, to obtain a first filtered liquid; a second, separation device for receiving said sediment-containing fraction, separating between the sediment and the liquid to obtain a second filtered liquid; and a third, filtration device for receiving said first and second filtered liquid, filtering out particulate material therefrom of a size larger of the predefined size, to form a filtered liquid reservoir and a particulate material-containing fraction. In accordance with this embodiment, the system preferably comprises also a feed line for feeding said particulate material-containing fraction back into said crusher.

The tubular body of the apparatus in accordance with the third aspect, typically forms a prismatic-shaped spiral. The spiral is preferably right-angled. The apparatus in accordance with this aspect is typically associated with a first treatment device for a pretreatment of the liquid to grind or shred the particulate material therein; and at times also with a second treatment device which is connected to the outlet of said tubular body for removing articles of defined characteristics from the liquid exiting from said outlet, e.g. the above defined filtration and separation subsystem. The second device, as is clearly elucidated from the description of the system above, is typically connected to the inlet of the apparatus to transfer thereto at least a portion of the separated articles for re-treatment.

Other preferred embodiments of the system will be elucidated from the detailed description of the invention below.

The invention will now be illustrated further in the following description of specific, non-limiting embodiments.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
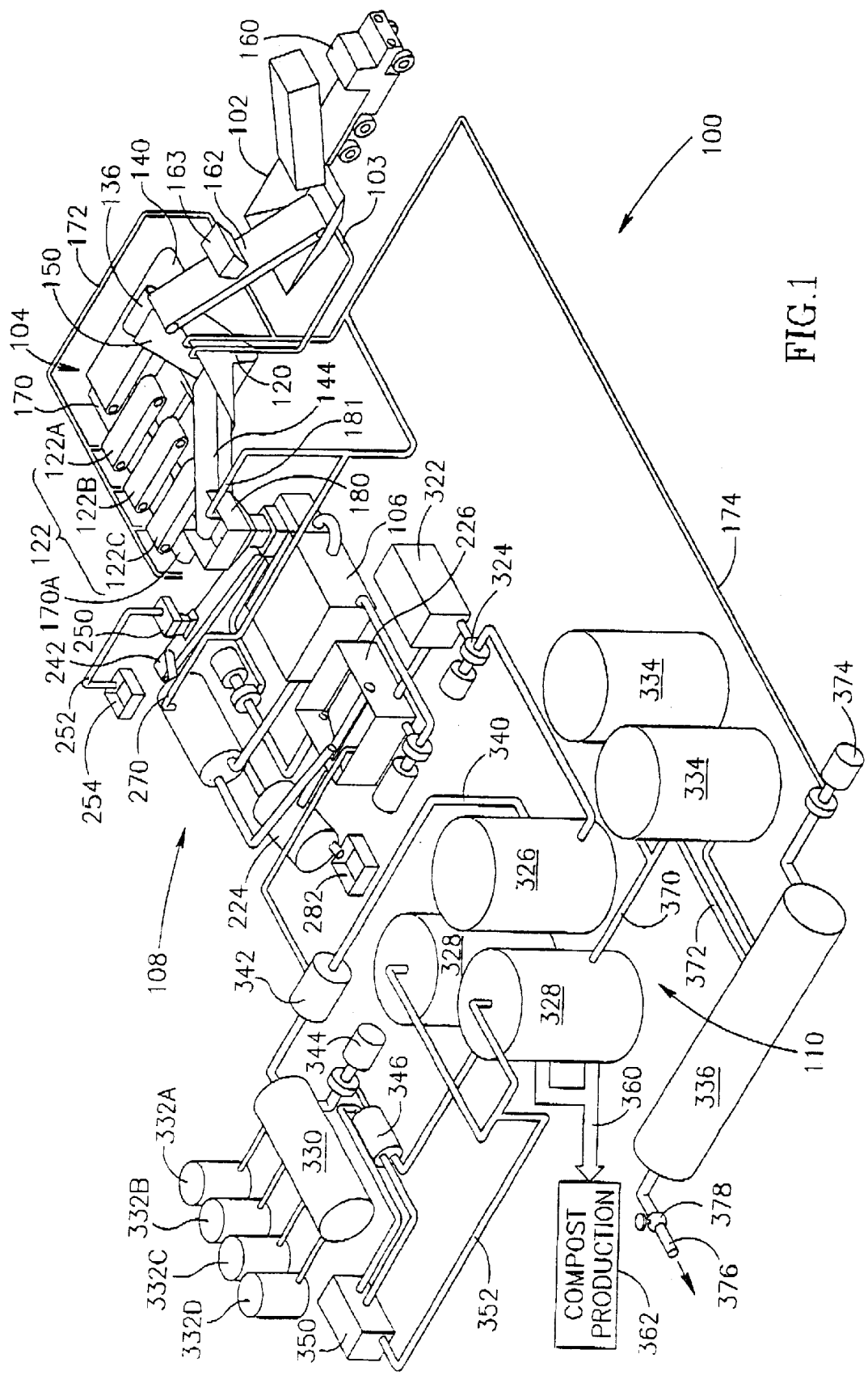
FIG. 1 shows an overall, schematic view of a system in accordance with the first aspect of the invention.
Figure 2:
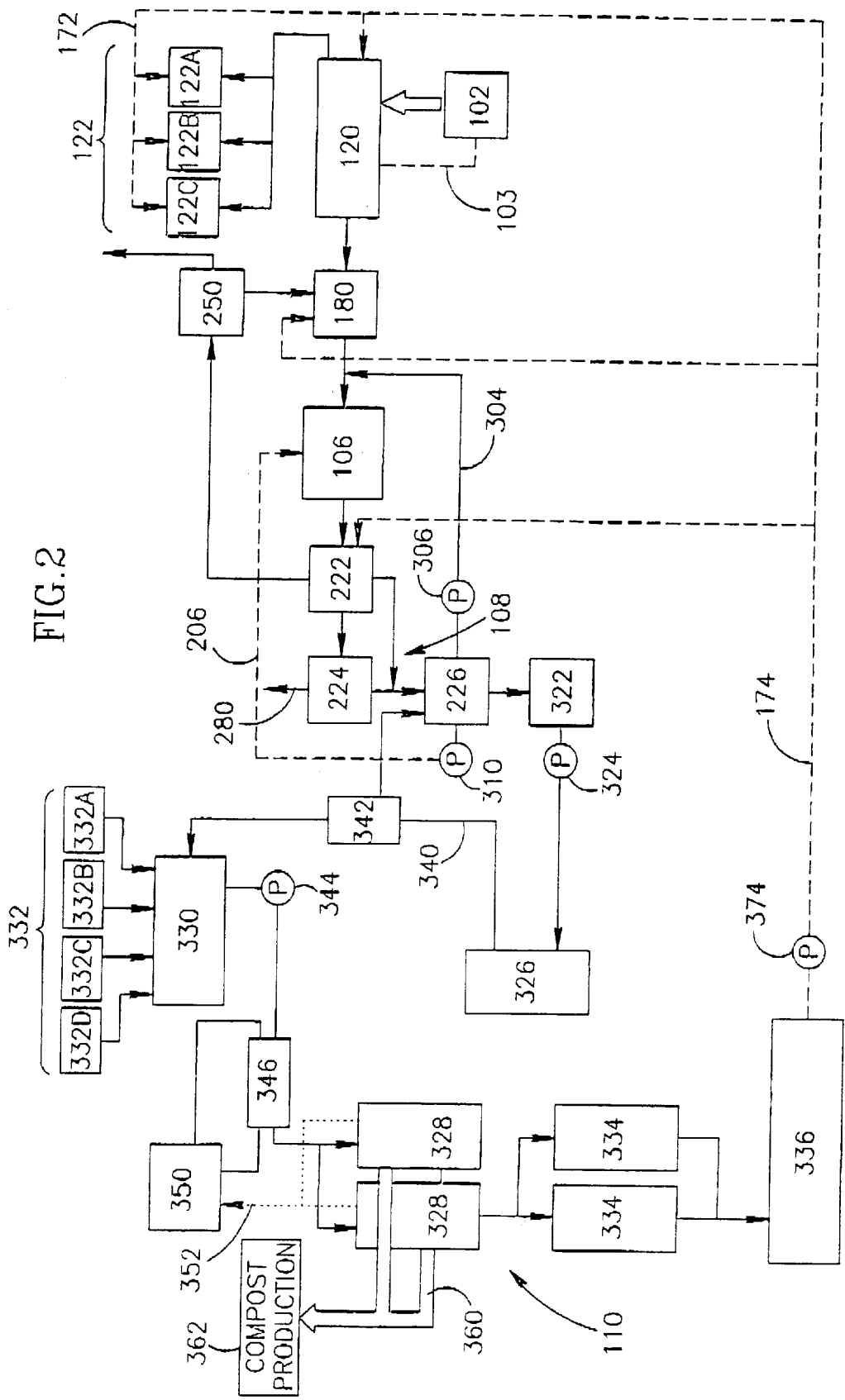
FIG. 2 shows a block diagram of the system illustrating the direction of transfer of material in the system as well as the feed line of the recycled rinsing liquid.

Reference is first being made to FIGS. 1 and 2, illustrating a system generally designated 100 in accordance with the first aspect of the invention. The system 100 comprises a waste receiving pit 102, a separator 104, a crusher 106, a filtration and separation subsystem 108 and a liquid fermentation subsystem 110, comprising one or more acetogenic fermentors 326, methanogenic fermentors 328 and aerobic fermentors 334.

Figure 3:
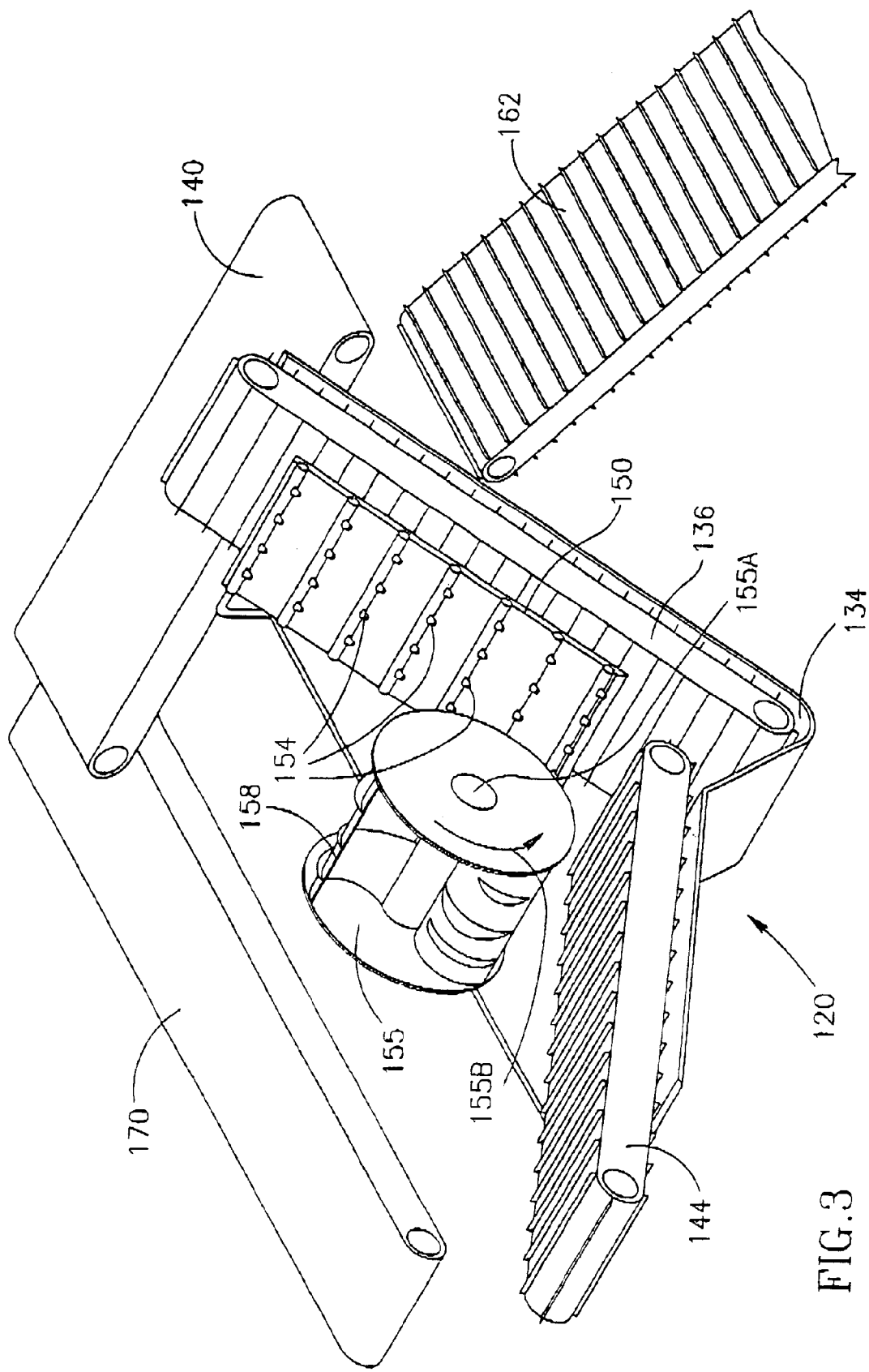
FIG. 3 illustrates an apparatus in accordance with the second aspect of the invention, with the side walls removed for the purpose of better illustration.
Figure 4:
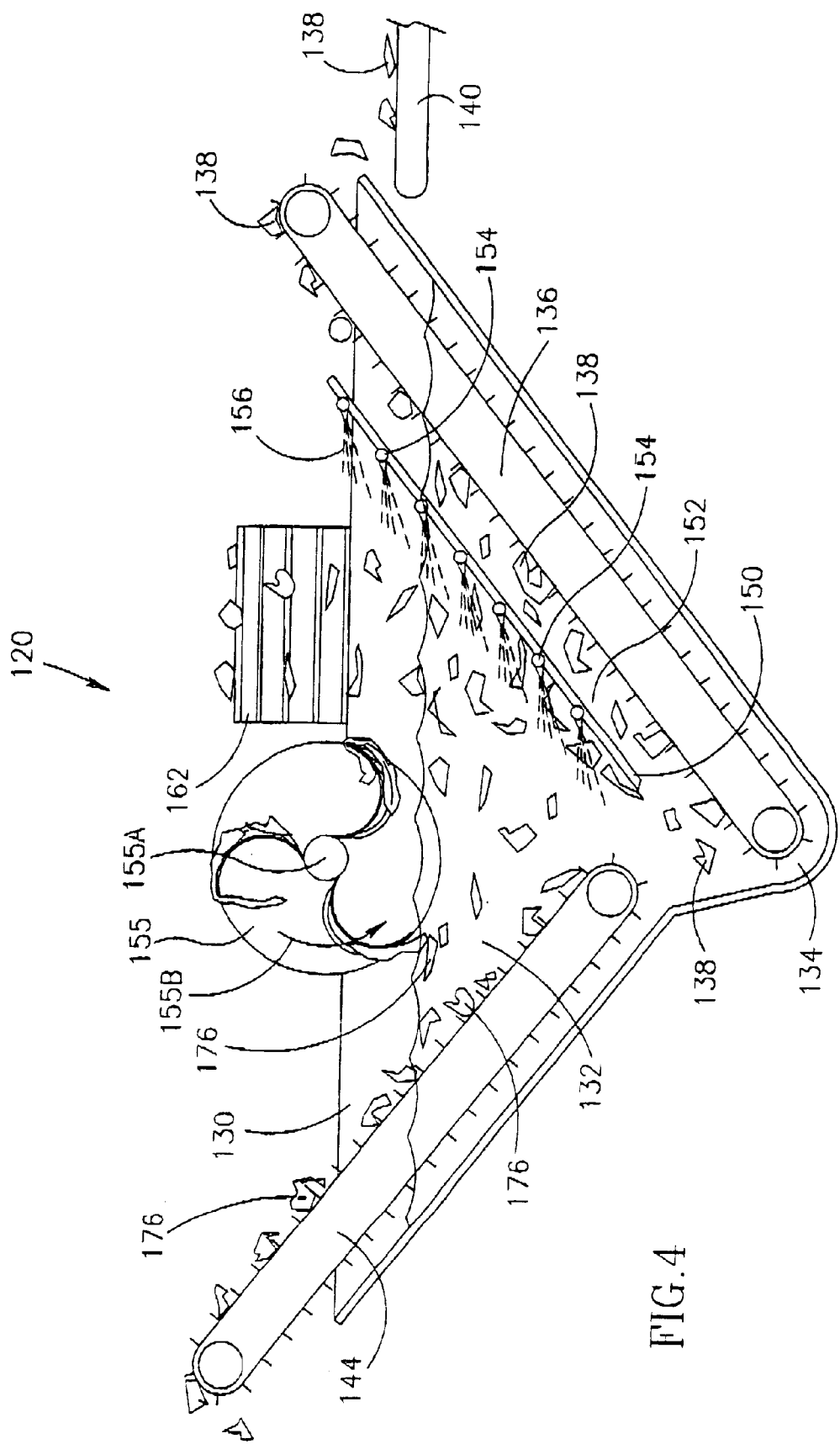
FIG. 4 shows a longitudinal cross-section of the apparatus illustrated in FIG. 3.

First separation subsystem 104 comprises a separation apparatus 120 shown in more detail in FIGS. 3 and 4 and a sorting subsystem 122. Apparatus 120, as can best be seen in FIGS. 3 and 4 has a water holding receptacle 130 holding a liquid 132 which has generally inverted para-metal shape with a sink portion 134. Disposed within receptacle 130 are two conveyors, consisting of a first conveyor 136 having its bottom end within the sink portion 134 and its top end extending out at one end of receptacle 130. Conveyor 136 conveys articles 138 (first waste material) which sink to sink portion 134 out of the receptacle and when reaching the top end of said first conveyor such articles drop onto conveyor belt 140 which transports the articles to sorter subsystem 122.

Receptacle 130 holds a second conveyor 144 the bottom end of which is at a level higher than that of said portion 134.

Apparatus 120 further comprises a barrier defining member 150, which in this specific embodiment is an essentially planar member (plate) situated parallel to conveyor 136 defining a clearance 152 sufficient to permit delivery of articles 138 by conveyor 136. Plate 150 typically extends between and supported by the side walls of receptacle 130.

Incorporated in member 150 are a plurality of liquid injection nozzles 154 which continuously or intermittently introduce pressurized streams of liquid 156 into the liquid within the receptacle. The incorporation of the nozzles into the barrier defining member 150 is but an example and a similar effect, as will be explained below, can also be achieved by disposing such injection nozzles in other portions of the apparatus, e.g. in the side walls of apparatus 120.

As can be seen in FIGS. 3 and 4, separation apparatus 120 comprises also an optional shredding device 155 having a general cylindrical form and rotatable about axis 155A in the direction represented by arrow 155B. Device 155 comprises several (three in this specific embodiment) of arcuated blades 158. When the blades impact solid matter in liquid 132, such a solid matter, e.g. plastic bags, diapers, particulate organic matter, etc., is cut and reduced to a smaller size.

MSW brought in by a truck 160 is emptied into a receiving pit 102 and then conveyed therefrom by means of conveyor 162 into receptacle 130. Liquid accumulated at the bottom of receiving pit 102 is pumped by means of a pump (not shown) through a pipe 103 into receptacle 130. Preferably, prior to entry into the receptacle 130 of apparatus 120, the waste is subjected to a preliminary treatment by rupturing apparatus 163, which ruptures the plastic bags included in the MSW. As will be appreciated there may be variety of other rupturing means for rupturing and opening the bags such as the optional shredding device 155 seen in FIGS. 3 and 4. It should be noted however that in accordance with some embodiments of the invention it is possible also to design the system such that MSW delivered by truck 160 will be emptied directly into receptacle 130, which in this case serves also as the receiving pit.

When the MSW (typically after rupturing the bags) enters receptacle 130, it mixes with liquid, e.g. re-cycled water, while waste articles having a specific gravity larger than water sink (the first waste material) to the bottom and collect in sink portion 134 while articles having a specific gravity lighter than that of water remain at the upper levels of liquid 132. The liquid sprayed out of injection nozzles 154, which as will be explained below is recycled water extracted from the waste and which is one of the products of the system, continuously replenishes liquid 132 and further creates turbulence within liquid 132 to drive the lighter articles towards conveyor 144. Thus, in this manner, heavier articles (namely those having a specific gravity larger than that of water) sink to sink portion 134 and then transported by conveyor 136 to eventually drop onto conveyor belt 140 and lighter waste articles are conveyed upward by conveyor 144 and subsequently treated as will be explained further below.

The heavier waste material received onto belt 140 is transported thereby onto sorter 122, which comprises a conveyor belt 170 that transports the waste material through a plurality of separation stations, three in this specific example—122A, 122B and 122C. When passing through each of these stations, specific waste articles are removed into the different stations based on their different characteristics. For example, solids comprised of a magnetic ferrous metal may be removed by means of a magnetic belt pulling waste material away from belt 170. The sorting of waste into different components generally is known per se (see for example U.S. Pat. Nos. 5,387,267 and 5,341,935). In addition, in accordance with a preferred embodiment of the invention, in each of these stations, the separated waste material is rinsed by recycled water fed through liquid feed line 172 which is branched from the major rinsing liquid feed line 174. The separated waste material may then be collected in different receptacles (not shown in FIG. 1). Remaining unsorted waste material on belt 170, will reach the end 170A of the belt and then fall into a further receptacle positioned there (not shown).

Figure 5:
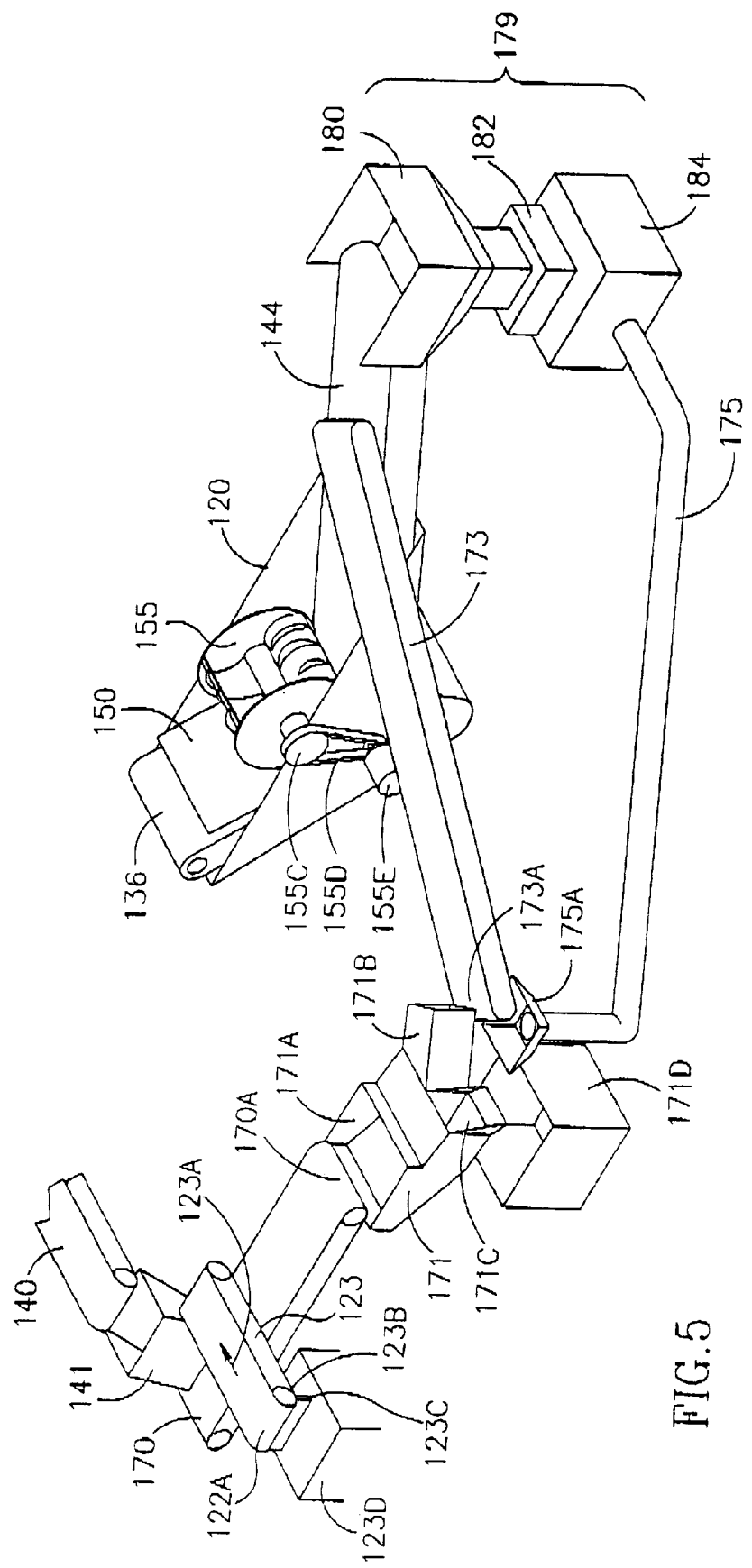
FIG. 5 shows one embodiment of a portion of the sorting subsystem of the system shown in FIG. 1.

A specific embodiment of the waste separation system 122 can be seen in FIG. 5 (viewed from an essentially opposite angle as the view point in FIG. 1).

Conveyor belt 140 feeds the initially unsorted solid waste into a funnel device 141 which then feeds the unsorted waste onto belt 170. Station 122A consists of a belt 123, placed above belt 170 and which may, according to one embodiment, be made of a magnetic material thereby drawing ferrous magnetic material out of the unsorted waste conveyed by belt 170. Belt 123 rotates in the direction of arrow 123A, and drawn magnetic waste attached to the bottom part of belt 123 disattaches at the end 123B of the belt 123 by a scraping action of barrier 123C (held by a separate supporting structure not shown). This waste then falls into waste receptacle 123D.

Unsorted waste reaching the end 170A of conveyor belt 170 is fed into a conduit device 171 having a top opening 171A adjacent end 170A of belt 170 and having two openings 171B and 171C. Under general condition of operation, outlet 171C will be closed, with all material exiting through outlet 171B into conveyor belt 173 which conveys the unsorted waste material back into conveyor 144. Opening 171B is situated close to end 173A of belt 173 and consequently the liquid exiting through opening 171B as well as small particulate matter fall down into funneled opening 175A of pipe 175 which leads this material directly into receptacle 184.

Occasionally, opening 171B may be closed and opening 171C opened whereby the unsorted waste material is collected in receptacle 171D.

Figure 6:
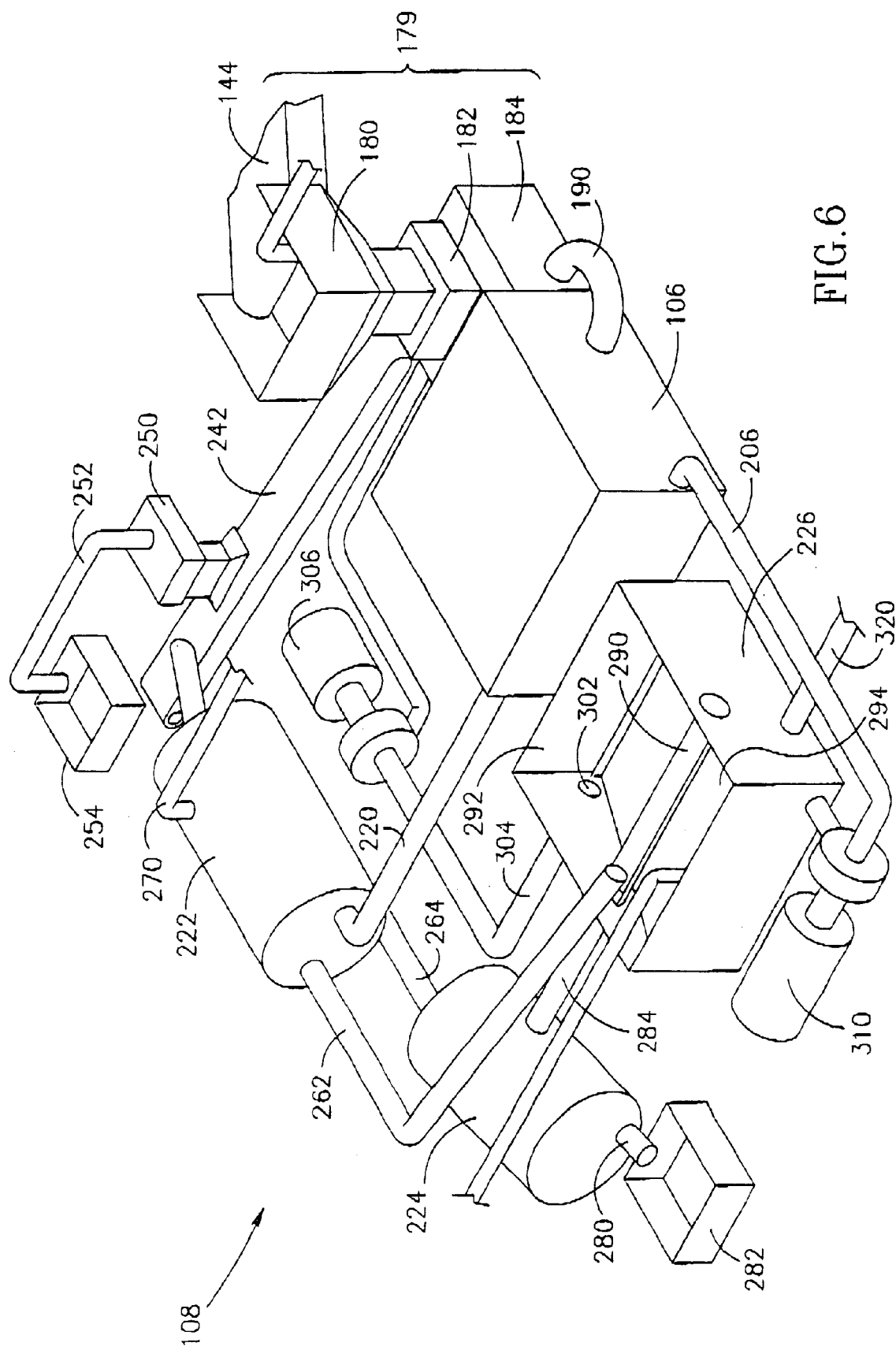
FIG. 6 shows an enlargement of a portion of the subsystem shown in FIG. 1, illustrating the crusher and the filtration-separation subsystem.

Lighter waste articles 176 (the second waste material) which include primarily biodegradable organic material, such as food remains (e.g. vegetables, fruit, meat, etc.), paper product, wood pulp, cardboard, etc. as well as non-degradable organic material such as plastic material and others, drop from the upper end of conveyor 144 into a pre-treatment in sub-system 179 for shredding, grinding/graining or both of the waste material. Subsequently the waste material is fed into crusher 106 and then is further treated in separation filtration subsystem 108, all of which can be more clearly seen in FIG. 6 with some components being further detailed in FIGS. 7–11.

Sub-system 179 typically consists of a shredder device 180 and a grainer or grinder device 182, with the former being above the later. The waste material in such a subsystem is first shredded to reduce the size of its particles and then treated to form some of its components, particularly the non-biodegradable components, mainly plastic, into grains to allow better subsequent separation thereof from the bio-degradable waste (after treatment in crusher 106—see below). After treatment in sub-system 179, the waste material mixed with liquid, some of which coming with the waste from apparatus 120, and some of which being optionally supplemented by a liquid coming from tube 181, is then fed into receptacle 184 from where this liquid-mix initially treated waste is fed through feeding pipe 190 into crusher 106, the operation of which according to a specific embodiment of the invention, will be explained with reference to FIGS. 7, 8A and 8B.

Figure 7:
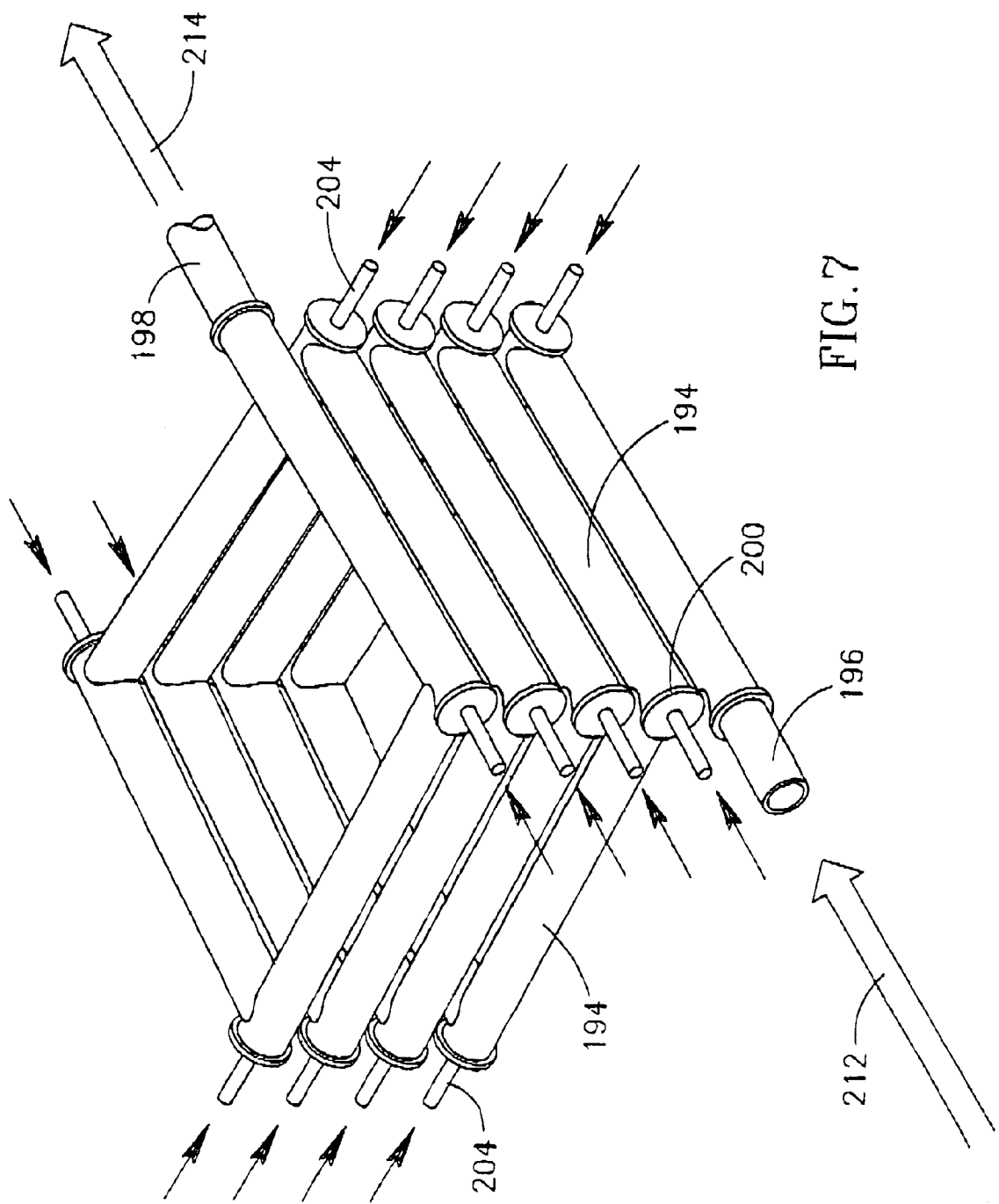
FIG. 7 shows a partial isometric view of the spiraling tube of the hydro crusher which is in accordance with the third aspect of the invention.
Figure 8A:
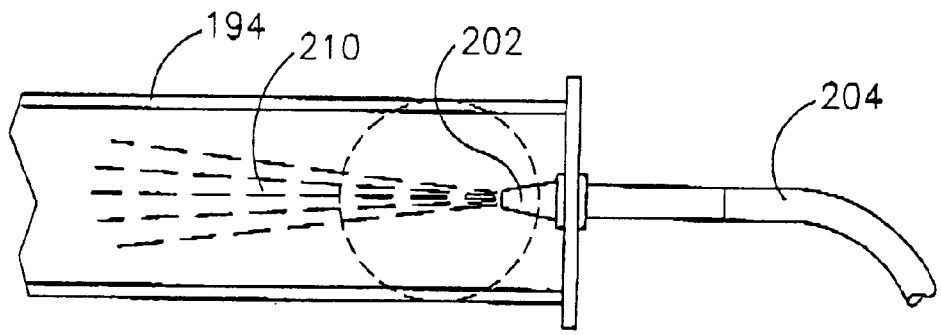
FIG. 8A shows an enlarged corner section of the crusher showing a tube and the spraying nozzle.
Figure 8B:
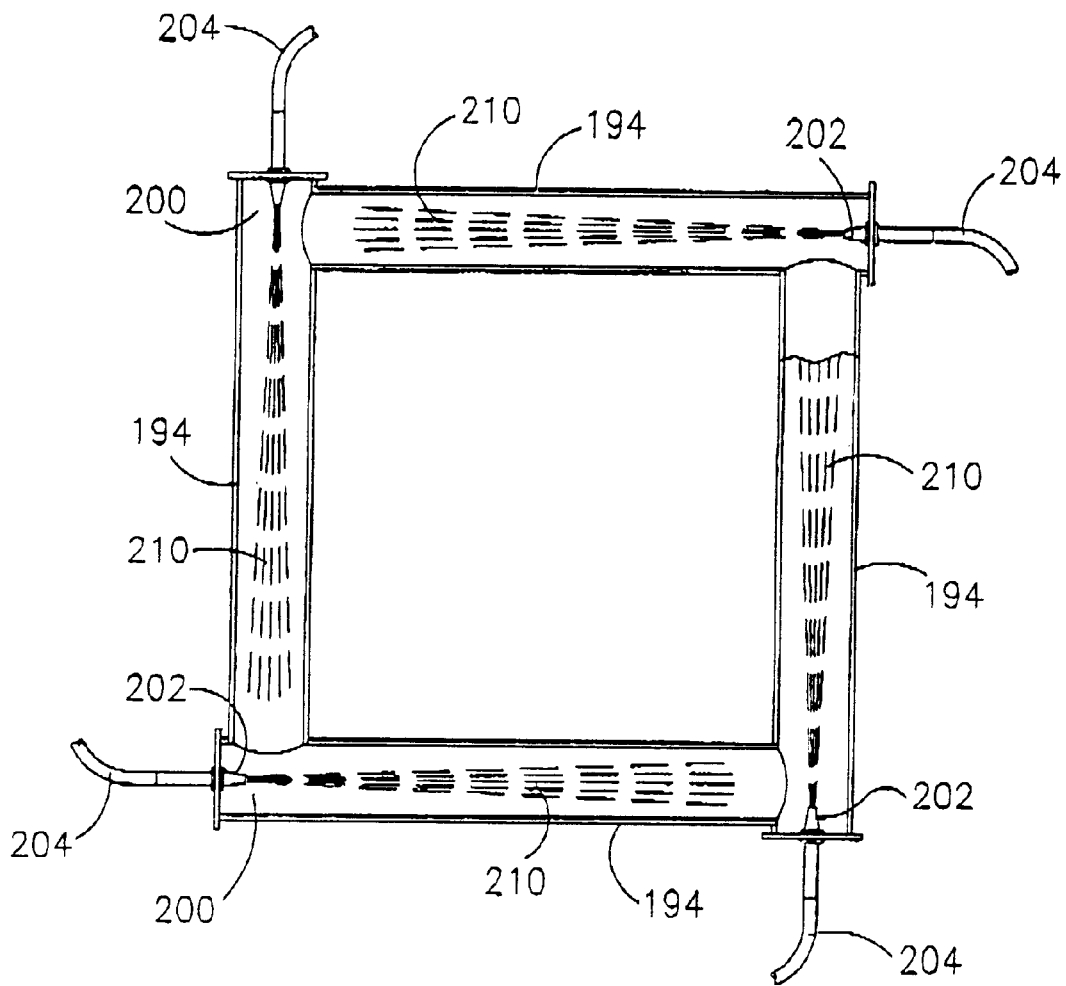
FIG. 8B shows a horizontal cross-section through one spiral turn of the tubular body of the hydro-crusher.
Figure 9A:
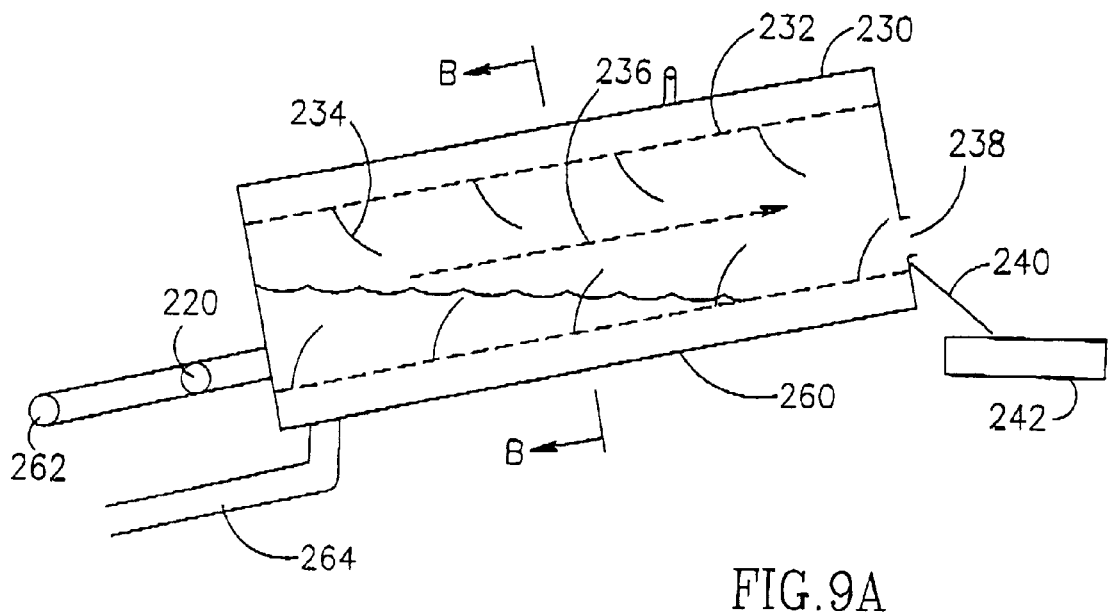
FIG. 9A is a longitudinal cross-section of the first, filtration separation device in the filtration-separation subsystem of FIG. 6.
Figure 9B:
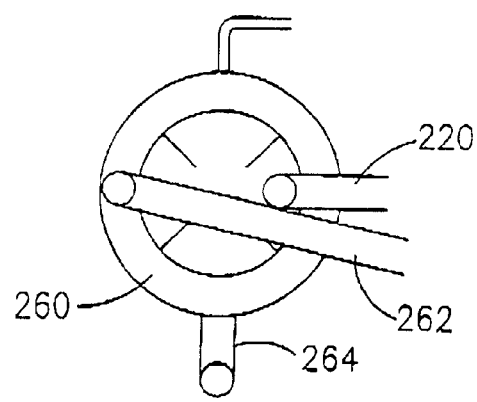
FIG. 9B is a cross-section through lines B—B in FIG. 9A.
Figure 10A:
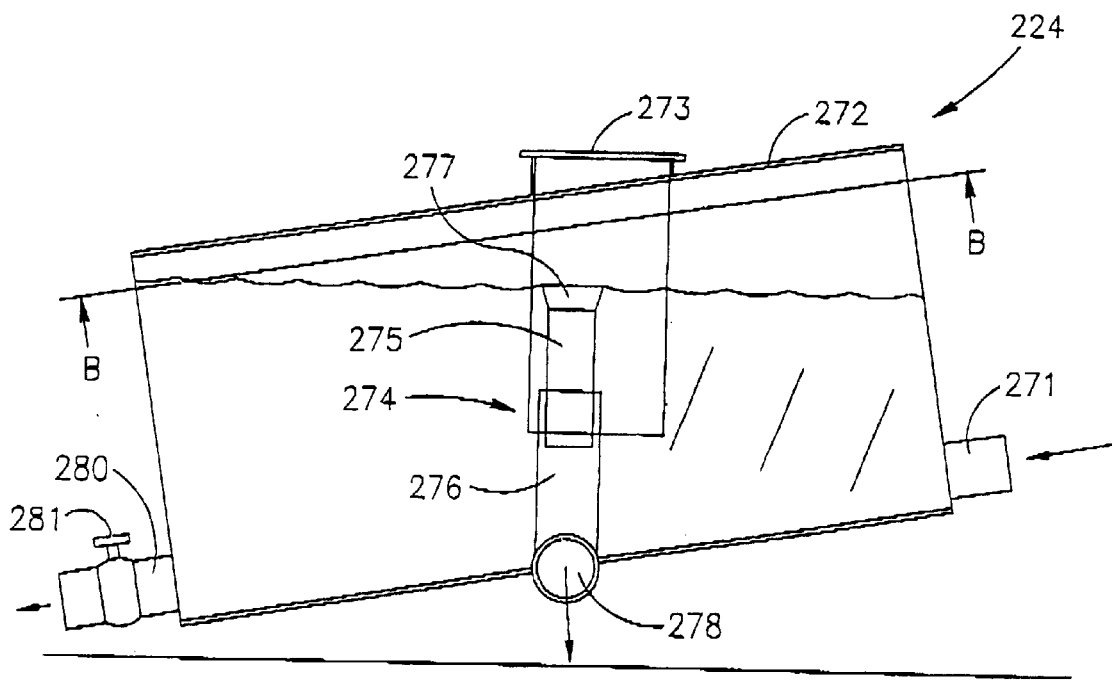
FIG. 10 is a longitudinal cross-section through the second separation device of the subsystem shown in FIG. 6.
Figure 10B:
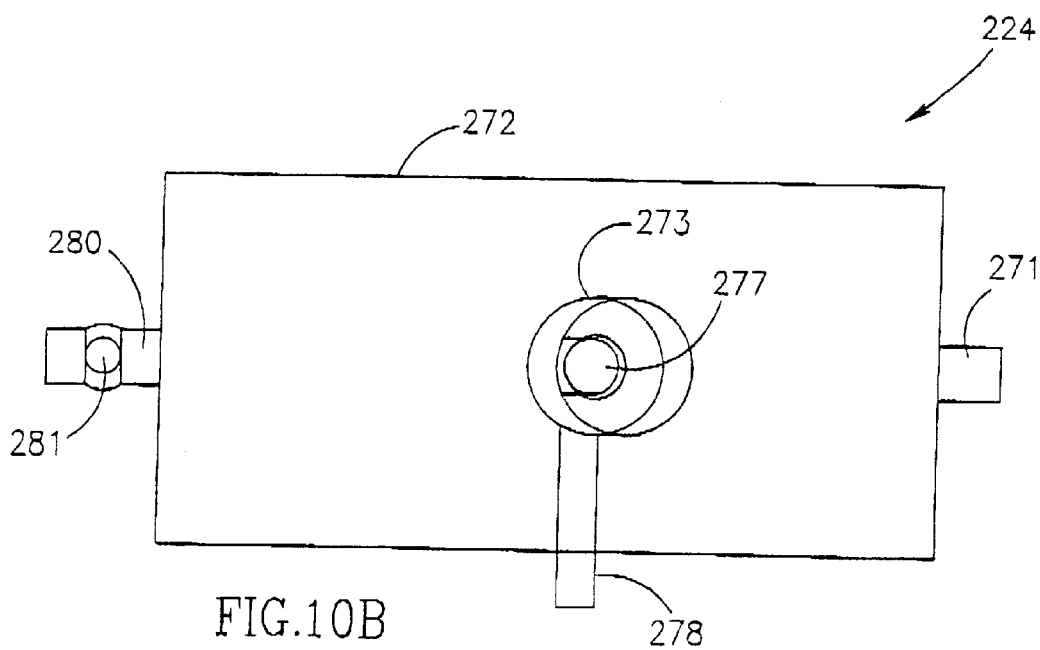

Hydro crusher 106 consists of a plurality of straight tube sections 194 defining together a flow path between liquid inlet 196 and liquid outlet 198. Each two tube sections 194 are connected to one another at ends thereof to form corners 200. In addition, each two connecting tube sections 194 consisting of one tube section which is more proximal, with respect to the flow path, to inlet 196 and a distal one. Disposed in each corner 200 is a liquid injection nozzle 202 which feeds the tube with pressurized liquid from tube 204, which is again connected through one or more manifold arrangements (not shown) to high pressure feed line 206 (see FIG. 6) which will be referred to again further below. The injection nozzles are arranged such that they inject a jet 210 of pressurized liquid from the proximal corner towards the distal one of two connecting tubes. In this way, waste material introduced to the hydro crusher through inlet 196, as represented by FIG. 7 by means of arrow 212, is propelled within the flow path by means of these high pressure liquid jets until exiting out from outlet 198, represented by means of arrow 214. These high liquid jets, in addition to propelling the waste, also has the effect of crushing the degradable organic material within the MSW (waste, food particles, paper, cardboard, etc.).

In this specific embodiment, the different tube sections 194 connect to one another of a right angle and form together a rectangular spiral arrangement. One should note that this is an example only and other arrangements may also be envisaged. For example, rather than a rectangular spiral arrangement, the different sections may be arranged to form a triangular, hexagonal or octagonal spiral arrangement. In addition, any arrangement of a plurality of tube sections connected to one another to form corners and having high liquid jets disposed such that they inject a high pressure liquid spray axially into a distal tube, may be employed as the hydro crusher in the system of the invention, which also forms an independent aspect as noted above.

The treated waste material flowing out of hydro-crusher 106, is fed through the 220 into a filtration and separation subsystem 108 consisting of a first, filtration separation device 222, a second, separation device 224 and a third, filtration device 226. Device 222, which can be seen in a longitudinal and transverse cross-sections in FIGS. 9A and 9B, respectively according to which device 222 has an external cylindrical body 230 and an internal rotating cylindrical member 232. The walls of member 232 may be perforated to form a sieve or may be in the form of a net. The openings in the walls of member 232 are of a predefined mesh to allow passage therethrough of only particles of predefined size. The liquid carrying the treated waste material flows through pipe 220 and enters the lumen defined by member 232. Member 232 has a spiral blade 234 and the entire member is continuously rotated, by means of a motor (not shown). Consequently, particulate matter large than the mesh in the walls of member 232 are propelled upwards, as represented by broken line arrow 236, to eventually exit through opening 228 and to slide over slide 240 onto conveyor belt 242.

The mesh of the walls of member 232 is made such so that the most particles remaining in the liquid coming out of hydro crusher 106 will filter through the walls and thus only large particles will remain in the lumen. These particles include primarily non crushable, non degradable material such as a plastic bag, bottles, etc.

This non filtered material received on conveyor 242 is transported, as can be seen in FIG. 1, to an air suction device 250 which sucks up all light material, including primarily plastic articles and particles that are then blown through tube 252 into receptacle 254. The matter received on conveyor 242 may include some non crushed material other than plastic which was not sufficiently crushed in the crusher and this is further transported by conveyor 242 back into receptacle 184 for a further treatment cycle through hydro crusher 106.

The filtered liquid is flown from the peripheral annular portion 260 defined between walls 230 and member 232 out through tube 262 into filtration device 226.

The annular portion 260 further opens at its lower bottom end to tube 264 which feeds sediments, including sand, small stones, etc., into separation device 224.

As can further be seen, device 222 receives rinsing liquid through feed line 270 which branches from major rinsing feed line 174. This rinses the article transported upwards to the outlet 238, whereby the collected plastic material in receptacle 254 is substantially rinsed.

Separation device 224 serves mainly for separation of sediments, primarily sand and stones, from the waste material. This device, seen in cross-section in FIG. 10, has a cylindrical body 272 with an opening on top 273 with a liquid inlet 271 connected to tube 264 and an outlet 280 fitted with a valve 281. Further included within separation device 224 is a telescopic tube member 274 consisting of two telescopically connected tube members 272 and 276 leading from a top opening 277 to a liquid outlet 278. Liquid entering through inlet 271 accumulates within separation device 224 up to the level of opening 277 and non-soluble sediment material such as stones or sand then sinks to the bottom which can periodically be emptied through outlet 280 into receptacle 282 (see FIGS. 1 and 6). The level of liquid within body 272 can be controlled by displacement of tube vis a vis member 275 tube monitor 276. Liquid outlet 278 is connected to tube 284 connecting device 224 with device 226.

Figure 11:
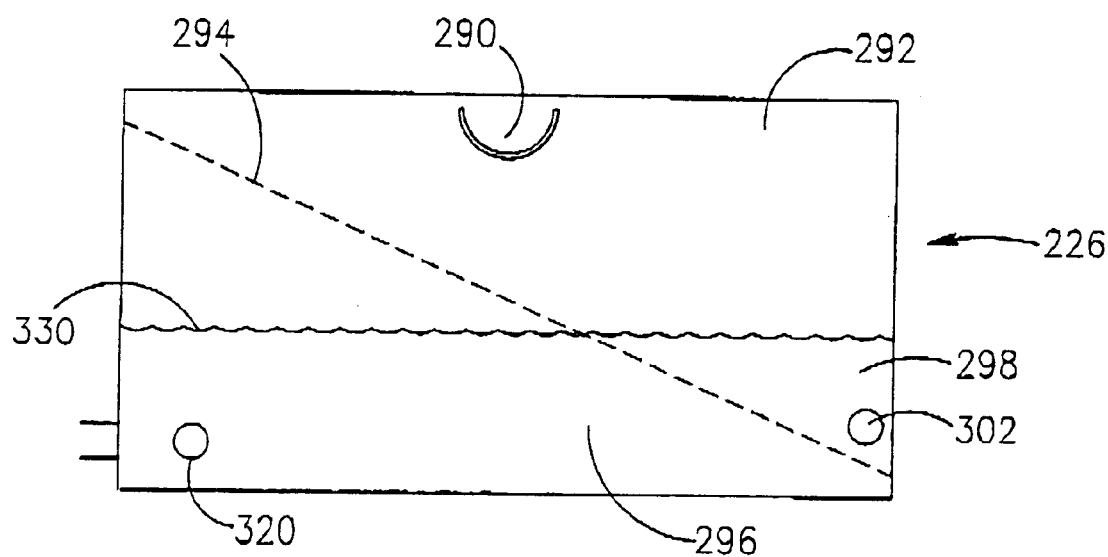
FIG. 11 is a longitudinal cross-section through the third, filtration device of the subsystem shown in FIG. 6.

Tube 284 of device 224, feeds into a trough-like member 290 of device 226, with the trough-structure being best seen in the cross-sectional view of FIG. 11. Trough member 290 serves as another catch for sand or other small sediments which may remain in the treated liquid coming from device 224.

Filtration device 226 consists of a basin 292 separated by a diagonal filter screen 294 into a filtered and non filtered portion 296 and 298, respectively. The liquid 300 collected in basin 292 has a part which is within portion 296, the latter being substantially filtered, and a non-filtered part contained with portion 298. The filtered portion forms a filtered liquid reservoir. Part of the non filtered liquid, with particulate matter contained therein, flows out through outlet 302, through tube 304, and propelled by pump 306, into receptacle 184 for further recycling within hydro crusher 106.

Pump 310 draws rinsing liquid from the filtered liquid reservoir and feeds the high pressured liquid through tube 206 into hydro crusher 106 which serves then to feed the injection nozzles as described above. In this way, the entire liquid which is used for crushing in the hydro crusher is recycled.

Excess filtered liquid is then pumped through tube 320 into buffer reservoir 322, by means of pump 324 and from there into the acetogenic fermentation tank 326 which is part of the biological reactor subsystem 110.

Subsystem 110 consists in addition to one or more acetogenic and methanogenic fermentors 326 and 328, respectively (according to this specific embodiment one acetogenic and two methanogenic fermentors), two in this specific embodiment, a mixing container 330 connected to one or more additive containers 332, three in this specific embodiment (332A, 332B and 332C), one or more final aerobic fermentors 334, two in this specific embodiment, and effluent water reservoir 336. Subsystem 110 further comprises a feed line 340, for feeding the liquid from fermentor 326 into tank 330. Disposed in feed line 340 is a filter device 342 which filters out particles remaining in this liquid and feeds them back into device 226. The flow of liquid through feed line 340 is propelled by means of pump 344 which then propels the liquid, through heat exchanger 346 into the methanogenic fermentor 328. The heat exchanger receives heat generated by means of generator 350. Generator 350 is fed methane produced in the methanogenic fermentors 328 which flows through biogas line 352 into generator 350. Additives from tanks 332A, 332B, 332C and 332D are controllably continuously fed into tank 330 and mixed with the liquid which then flows into the methanogenic fermentor 328. These additives include, for example, NaOH and/or other basic chemicals for pH control, citric acid and/or other acidic chemicals for pH control as well, trace element solutions, as well as acclimated wild-type microorganismal flora.

The fermentation in the methanogenic fermentor yields also production of organic material, consisting primarily of dead bacterial cells, which accumulates at the bottom of the container. This organic material is periodically collected, as represented by arrows 360 into a compost production unit, 362, as generally known per se.

Liquid produced in fermentor 328 is then drawn, by means of a pump (not shown) through pipes 370 into aerobic fermentors 334 for final water purification treatment. The obtained water effluent can then be collected, through pipes 372 in effluent reservoir 336. Effluent reservoir serves for rinsing liquid which is fed by pump 374 into main rinsing liquid feed line 174 from where it branches to the various locations including the nozzles in the separator device 120, rinsing nozzles in sorter units 122A–C, into the shredding and grinding unit 180, etc. Excess affluent may then be drawn through outlet 376, controlled by valve 378 for irrigation or the like.

As will readily be appreciated by the artisan, the above described specific embodiments are intended for illustrative purposes only of the much wider scope of the invention as defined above. As will further be appreciated, many routine modifications of these embodiments, as well as a large amount of other embodiments are possible and within the reach of an artisan applying ordinary skills in the art, within the general scope of the invention as defined herein.

What is claimed is:

1. A system for treatment of unsorted collected waste, comprising:

a waste receiving pit;

a least one first separator for separating the received waste between first waste material having a specific gravity equal or less than that of water and second waste material having a specific gravity above that of water and continuously removing said first and said second waste material from the first separator as it is separated;

at least one crusher for continuously receiving said first waste material, substantially crushing at least a particulate portion thereof to a smaller particulate form to obtain treated waste material and producing a liquid product comprising water carrying the treated waste material;

at least one acetogenic fermentor for receiving said liquid product and for anaerobic acetogenic fermentation thereof to produce a first fermented effluent;

at least one methanogenic fermentor for receiving said first fermented effluent and for anaerobic methanogenic fermentation thereof to produce a second fermented effluent;

at least one liquid feed line for feeding at least one of said first of said second effluent into one or more of the system's devices or subsystems including at least one of said first separator and said crusher.

2. A system according to claim 1, wherein said at least one separator, comprises:

a liquid holding receptacle with an open top for receiving the waste and a bottom end formed with a sink portion for receiving articles with a specific gravity larger than that of water;

a first conveyor with its bottom end within said sink portion and its top end extending out of the receptacle to convey said second waste material from said sink portion to a first collecting device outside said receptacle, and a second conveyor with its bottom end at another portion of the receptacle being at a level higher than that of said sink portion to convey said first waste material to a second collecting device;

a barrier-defining member situated above said first conveyor at a clearance therefrom permitting delivery of said second waste material by said first conveyor and defining a barrier for articles introduced into the receptacle from directly contacting said first conveyor but through said sink portion;

liquid injection nozzles disposed within said receptacle for injection of liquid streams into the liquid within the receptacle to impart lateral movement onto articles within said liquid.

3. A system according to claim 1, wherein said separator comprises a shredding device for shredding solid matter dispersed within said liquid.

4. A system according to claim 1, comprising:

a sorter subsystem for receiving said second waste material and for sorting it according to predefined characteristics.

5. A system according to claim 4, wherein said sorter subsystem is connected to at least one of said liquid feed lines for rinsing the sorted waste material.

6. A system according to claim 1, comprising:

one or more devices for receiving said first waste material and for treating it by grinding, shredding or both and feeding the treated product into said crusher.

7. A system according to claim 1, wherein said crusher comprises:

a tubular body defining a flow path between a liquid inlet and a liquid outlet, the tubular body having a plurality of straight sections, two adjacent sections, consisting of a proximal section being the one more proximal to the inlet and a distal section, being connected to one another at corners with an angle between them; and high pressure liquid nozzles disposed within the tubular body at corners thereof and arranged such that they inject an axial jet of pressurized liquid into the distal section, said first waste material being crushed as it is propelled through the tubular body by said jets.

8. A system according to claim 7, wherein said nozzles are connected and receive high liquid pressure from a high pressure pump pumping liquid from a filtered liquid reservoir containing liquid separated in a filtration and separation subsystem.

9. A system according to claim 1, comprising:

a filtration and separation subsystem for separating particulate material with a particle size above a predefined size from the liquid received from said crusher;

a feed line for feeding the separated particulate material back into said crusher; and a feed line for feeding the liquid to the acetogenic fermentor.

10. A system according to claim 9, wherein said filtration and separation subsystem comprises:

a first, filtration and separation device, for receiving said liquid product, filtering out therefrom particulate material of a size above a predefined size and for separating a sediment-containing fraction from the filtered liquid, to obtain a first filtered liquid;

a second, separation device for receiving said sediment-containing fraction, separating between the sediment and the liquid to obtain a second filtered liquid; and a third filtration device for receiving said first and second filtered liquid, filtering out particulate material therefrom of a size larger of the predefined size, to form a filtered liquid reservoir and a particulate material-containing fraction.

11. A system according to claim 1, comprising a feed line for feeding said particulate material-containing fraction back into said crusher.

12. A system according to claim 1, comprising:

a feed line for feeding fermented liquid from the acetogenic fermentor into the methanogenic fermentor which comprises a filter for filtering out particulate material of a size above a predefined size, and filter being connected to said filtration and separation subsystems for feeding the filtered out material thereto.

13. A system according to claim 12, wherein said feed line is linked to one or more additive sources for supplementing said first fermented effluent fed into the methanogenic fermentor with said additives, to produce a second fermented effluent.

14. A system according to claim 13, wherein the effluent fed into the methanogenic fermentor is heated.

15. A system according to claim 14, wherein the heat is provided by a generator generating energy from the combusting methane produced by the methanogenic fermentor.

16. A system according to claim 13 comprising one or more aerobic fermentors for final fermentation treatment of said second fermented effluent from the one or more methanogenic fermentors.

17. A system for treatment of unsorted collected waste, comprising:

a waste receiving pit;

at least one first separator for separating the received waste between first waste material having a specific gravity equal or less than of water and second waste material having a specific gravity above that of water and continuously removing said first and said second waste material from the first separator as it is separated;

at least one crusher for continuously receiving said first waste material, substantially crushing at least a particulate portion thereof to a smaller particulate form to obtain treated waste material and producing a liquid product comprising water carrying the treated waste material;

at least one acetogenic fermentor for receiving said liquid product and for anaerobic acetogenic fermentation thereof to produce a first fermented effluent;

at least one methanogenic for receiving said first fermented effluent and for anaerobic methanogenic fermentation thereof to produce a second fermented effluent;

at least one liquid feed line for feeding at least one of said first or said second effluent into said first separator and said crusher.

18. A system according to claim 17, wherein said at least one separator, comprises:

a liquid-holding receptacle with an open top for receiving the waste and a bottom end formed with a sink portion for receiving articles with a specific gravity larger than that of water;

a first conveyor with its bottom end within said sink portion and its top end extending out of the receptacle to convey said second waste material from said sink portion to a first collecting device outside said receptacle, and a second conveyor with its bottom end at another portion of the receptacle being at a level higher than that of said sink portion to convey said first waste material to a second collecting device;

a barrier-defining member situated above said first conveyor at a clearance therefrom permitting delivery of said second waste material by said first conveyor and defining a barrier for articles introduced into the receptacle from directly contacting said first conveyor but through said sink portion;

liquid injection nozzles disposed within said receptacle for injection of liquid streams into the liquid within the receptacle to impart lateral movement onto articles within said liquid.

19. A system according to claim 17, wherein said separator comprises a shredding device for shredding solid matter dispersed within said liquid.

20. A system according to claim 17, comprising:
a sorter subsystem for receiving said second waste material and for sorting it according to predefined characteristics.

21. A system according to claim 20, wherein said sorter subsystem is connected to at least one of said liquid feed lines for rinsing the sorted waste material.

22. A system according to claim 17, comprising:
one or more devices for receiving said first waste material and for treating it by grinding, shredding or both and feeding the treated product into said crusher.

23. A system according to claim 17, wherein said crusher comprises:
a tubular body defining a flow path between a liquid inlet and a liquid outlet, the tubular body having a plurality of straight sections, two adjacent sections, consisting of a proximity section being the one more proximal to the inlet and a distal section, being connected to one another at corners with an angle between them; and
high pressure liquid nozzles disposed within the tubular body at corners thereof and arranged such that they inject an axial jet of pressurized liquid into the distal section, said first waste material being crushed as it is propelled through the tubular body by said jets.

24. A system according to claim 23, wherein said nozzles are connected and receive high liquid pressure from a high pressure pump pumping liquid from a filtered liquid reservoir containing liquid separated in a filtration and separation subsystem.

25. A system according to claim 17, comprising:
a filtration and separation subsystem for separating particulate material with a particle size above a predefined size from the liquid received from said crusher;
feed line for feeding the separated particulate material back into said crusher; and
a feed line for feeding the liquid to the acetogenic fermentor.

26. A system according to claim 25, wherein said filtration and separation subsystem comprises:
a first, filtration and separation device, for receiving said liquid product, filtering out therefrom particulate material of a size above a predefined size and for separating a sediment-containing fraction from the filtered liquid, to obtain a first filtered liquid;
a second, separation device for receiving said sediment-containing fraction, separating between the sediment and the liquid to obtain a second filtered liquid; and
a third, filtration device for receiving said first and second filtered liquid, filtering out particulate material therefrom of a size larger of the predefined size, to form a filtered liquid reservoir and a particulate material-containing fraction.

27. A system according to claim 17, comprising a feed line for feeding said particulate material-containing fraction back into said crusher.

28. A system according to claim 17, comprising:
a feed line for feeding fermented liquid from the acetogenic fermentor into the methanogenic fermentor which comprises a filter for filtering out particulate material of a size above a predefined size, said filter being connected to said filtration and separation subsystems for feeding the filtering out material thereto.

29. A system according to claim 28, wherein said feed line is linked to one or more additive sources for supplementing said first fermented effluent fed into the methanogenic fermentor with said additives, to produce a second fermented effluent.

30. A system according to claim 29 wherein the effluent fed into the methanogenic fermentor is heated.

31. A system according to claim 30, wherein the heat is provided by a generator generating energy from the combusting methane produced by the methanogenic fermentor.

32. A system according to claim 29 comprising one or more aerobic fermentors for final fermentation treatment of said second fermented effluent from the one or more methanogenic fermentors.

33. A system for treatment of unsorted collected waste, comprising:
a waste receiving pit;
at least one first separator for separating the received waste between first waste material having a specific gravity equal or less than that of water and second waste material having a specific gravity above that of water and continuously removing said first and said second waste material from the first separator as it is separated;
at least one crusher for continuously receiving said first waste material, substantially crushing at least a particulate portion thereof to a smaller particulate form to obtain treated waste material and producing a liquid product comprising water carrying the treated waste material;
at least one acetogenic fermentor for receiving said liquid product and for anaerobic acetogenic fermentation thereof to produce a first fermented effluent;
at least one methanogenic fermentor for receiving said first fermented effluent and for anaerobic methanogenic fermentation thereof to produce a second fermented effluent;
at least one liquid feed line for feeding at least one of said first or said second effluent into the system's devices or subsystems.

34. A system according to claim 33, wherein said at least one separator, comprises:
a liquid-holding receptacle with an open top for receiving the waste and a bottom end formed with a sink portion for receiving articles with a specific gravity larger than that of water;
a first conveyor with its bottom end within said sink portion and its top end extending out of the receptacle to convey said second waste material from said sink portion to a first collecting device outside said receptacle, and a second conveyor with its bottom end at another portion of the receptacle being at a level higher than that of said sink portion to convey said first waste material to a second collecting device;
a barrier-defining member situated above said first conveyor at a clearance therefrom permitting delivery of said second waste material by said first conveyor and defining a barrier for articles introduced into the receptacle from directly contacting said first conveyor but through said sink portion;
liquid injection nozzles disposed within said receptacle for injection of liquid streams into the liquid within the receptacle to impart lateral movement onto articles within said liquid.

35. A system according to claim 33, wherein said separator comprises a shredding device for shredding solid matter dispersed within said liquid.

36. A system according to claim 33, comprising:
a sorter subsystem for receiving said second waste material and for sorting it according to predefined characteristics.

37. A system according to claim 33, wherein said sorter subsystem is connected to at least one of said liquid feed lines for rinsing the sorted waste material.

38. A system according to claim 33, comprising:
one or more devices for receiving said first waste material and for treating it by grinding, shredding or both and feeding the treated product into said crusher.

39. A system according to claim 33, wherein said crusher comprises:
a tubular body defining a flow path between a liquid inlet and a liquid outlet, the tubular body having a plurality of straight sections, two adjacent sections, consisting of a proximal section being the one more proximal to the inlet and a distal section, being connected to one another at corners with an angle between them; and
high pressure liquid nozzles disposed within the tubular body at corners thereof and arranged such that they inject an axial jet of pressurized liquid into the distal section, said first waste material being crushed as it is propelled through the tubular body by said jets.

40. A system according to claim 39, wherein said nozzles are connected and receive high liquid pressure from a high pressure pump pumping liquid from a filtered liquid reservoir containing liquid separated in a filtration and separation subsystem.

41. A system according to claim 33, comprising:
a filtration and separation subsystem for separating particulate material with a particle size above a predefined size from the liquid received from said crusher;
a feed line for feeding the separated particulate material back into said crusher; and
a feed line for feeding the liquid to the acetogenic fermentor.

42. A system according to claim 41, wherein said filtration and separation subsystem comprises:
a first, filtration and separation device, for receiving said liquid product, filtering out therefrom particulate material of a size above a predefined size and for separating a sediment-containing fraction from the filtered liquid, to obtain a first filtered liquid;
a second, separation device for receiving said sediment-containing fraction, separating between the sediment and the liquid to obtain a second filtered liquid; and
a third, filtration device for receiving said first and second filtered liquid, filtering out particulate material therefrom of a size larger of the predefined size to form a filtered liquid reservoir and a particulate material containing fraction.

43. A system according to claim 33, comprising a feed line for feeding said particulate material-containing fraction back into said crusher.

44. A system according to claim 33, comprising:
a feed line for feeding fermented liquid from the acetogenic fermentor into the methanogenic fermentor which comprises a filter for filtering out particulate material of a size above a predefined size said filter being connected to said filtration and separation subsystems for feeding the filtered out material thereto.

45. A system according to claim 44, wherein said feed line is linked to one or more additive sources for supplementing said first fermented effluent fed into the methanogenic fermentor with said additives, to produce a second fermented effluent.

46. A system according to claim 45, wherein the effluent fed into the methanogenic fermentor is heated.

47. A system according to claim 46, wherein the heat is provided by a generator generating energy from the combusting methane produced by the methanogenic fermentor.

48. A system according to claim 45 comprising one or more aerobic fermentors for final fermentation treatment of said second fermented effluent from the one or more methanogenic fermentors.

* * * * *

UNITED STATES PATENT AND TRADEMARK OFFICE
CERTIFICATE OF CORRECTION

PATENT NO.    : 6,368,500 B1                                          Page 1 of 1
DATED         : April 9, 2002
INVENTOR(S)   : Amir Asa and Israel Faig It is certified that error appears in the above-identified patent and that said Letters Patent is hereby corrected as shown below:

Column 10,
Line 44, change "first of" to -- first or --

Column 12,
Line 2, change "and" to -- said --
Line 39, after "methanogenic" insert -- fermentor --

Signed and Sealed this

Sixteenth Day of July, 2002

Attest:

Attesting Officer

JAMES E. ROGAN
Director of the United States Patent and Trademark Office